(12) United States Patent
Larnholm et al.

(10) Patent No.: US 7,833,298 B2
(45) Date of Patent: Nov. 16, 2010

(54) SYSTEM AND INLET DEVICE FOR SEPARATING A MIXTURE

(75) Inventors: Per-Reidar Larnholm, Moss (NO); Robert Schook, Ec Duiven (NL)

(73) Assignee: FMC Technologies C.V., Amsterdam (NL)

( * ) Notice: Subject to any disclaimer, the term of this patent is extended or adjusted under 35 U.S.C. 154(b) by 227 days.

(21) Appl. No.: 11/916,699

(22) PCT Filed: Jun. 9, 2006

(86) PCT No.: PCT/NL2006/000283
§ 371 (c)(1),
(2), (4) Date: Nov. 3, 2008

(87) PCT Pub. No.: WO2006/132527
PCT Pub. Date: Dec. 14, 2006

(65) Prior Publication Data
US 2009/0196806 A1 Aug. 6, 2009

(30) Foreign Application Priority Data
Jun. 10, 2005 (NL) .................................... 1029230

(51) Int. Cl.
*B01D 50/00* (2006.01)
(52) U.S. Cl. .............................. 55/337; 55/318; 55/325; 55/346; 55/348; 55/327; 55/428; 55/482; 55/485; 55/418; 55/440; 55/525; 55/527; 55/459.1; 95/268; 95/269; 95/287

(58) Field of Classification Search ........... 55/318–325, 55/337, 346, 348, 327, 428, 482, 485, 418, 55/440, 459.1, 525, 527; 95/268, 269, 287
See application file for complete search history.

(56) References Cited

U.S. PATENT DOCUMENTS

| 3,010,537 | A | * | 11/1961 | Ovid et al. ................. | 55/323 |
| 3,212,234 | A | * | 10/1965 | McMinn ...................... | 95/242 |
| 3,822,533 | A |   | 7/1974  | Oranje ........................ | 55/394 |
| 3,859,063 | A | * | 1/1975  | Porter et al. ................. | 96/297 |

(Continued)

FOREIGN PATENT DOCUMENTS
EP 0 436 973 A2 11/1990

(Continued)

*Primary Examiner*—Jason M Greene
*Assistant Examiner*—Dung Bui
(74) *Attorney, Agent, or Firm*—Williams, Morgan & Amerson, P.C.

(57) ABSTRACT

The invention relates to a system for separating a mixture of gas and liquid into a heavy fraction and a light fraction, the system comprising:—a separation vessel having a vessel inlet for the supply of the mixture to be separated, an upper vessel outlet for the discharge of the light fraction and a lower vessel outlet for the discharge of the heavy fraction;—at least one inlet device for pretreatment of the incoming mixture, the inlet device, comprising a casing having a liquid outlet for the discharge of a first mixture part mainly containing liquid to a lower compartment of the separation vessel; and at least one demister element arranged at a position below the liquid outlet for separating liquid from the gas in the first mixture part flowing from the liquid output.

30 Claims, 5 Drawing Sheets

U.S. PATENT DOCUMENTS

| | | | |
|---|---|---|---|
| 3,873,283 A * | 3/1975 | Hamblin | 96/189 |
| 3,997,303 A * | 12/1976 | Newton | 95/284 |
| 4,359,329 A * | 11/1982 | Willeitner | 55/320 |
| 4,537,608 A * | 8/1985 | Koslow | 55/337 |
| 4,539,023 A * | 9/1985 | Boley | 96/184 |
| 4,767,424 A * | 8/1988 | McEwan | 55/329 |
| 6,190,543 B1 * | 2/2001 | Christiansen | 210/87 |
| 6,673,135 B2 * | 1/2004 | West | 95/268 |
| 2004/0154272 A1 * | 8/2004 | McKenzie | 55/423 |
| 2005/0011170 A1 * | 1/2005 | Christiansen et al. | 55/345 |
| 2005/0060970 A1 * | 3/2005 | Polderman | 55/320 |
| 2005/0204917 A1 * | 9/2005 | Haland et al. | 95/268 |
| 2007/0044437 A1 * | 3/2007 | Larnholm et al. | 55/319 |
| 2008/0168753 A1 * | 7/2008 | Christiansen et al. | 55/440 |

FOREIGN PATENT DOCUMENTS

| | | |
|---|---|---|
| EP | 1 154 862 B1 | 11/1999 |
| GB | 2 090 163 A | 1/1981 |
| WO | WO 00/25931 | 5/2000 |
| WO | WO 00/74815 A2 | 12/2000 |
| WO | WO 03/033106 A1 | 4/2003 |
| WO | WO 03/074156 A1 | 9/2003 |

* cited by examiner

SYSTEM AND INLET DEVICE FOR SEPARATING A MIXTURE

BACKGROUND OF THE INVENTION

1. Field of the Invention

The present disclosure relates to a system for separating a mixture of at least one gas and at least one liquid into a heavy fraction mainly containing liquid and a light fraction mainly containing gas. The disclosure also relates to an inlet device for pretreatment of a mixture of at least one gas and at least one liquid to be separated into a heavy fraction and a light fraction.

2. Description of the Related Art

In the oil and gas industry, separators are known for separating the supplied mixture of liquid (oil and/or water) and gas into a stream of substantially gas and a stream of substantially liquid. Numerous separators are known for separating such gas/liquid mixtures.

Known from WO 03/074156 A1 is a separator consisting of an upright column (upright vessel) provided with an inlet for the mixture to be separated and a first and second outlet for the discharge of, respectively, the separated heavy fraction and light fraction of the mixture. In the known separator, the incoming mixture is separated in three stages.

In the first separation stage, a first liquid/gas separation is carried out by a pretreatment unit connected to the inlet. The known pretreatment unit is a vane-type inlet device which is placed on the inlet stub of the separating vessel and which is provided with a number of curved blades which uniformly absorb the moment of the incoming gas-liquid flow. The blades then guide the gas-liquid flow laterally into the lower compartment of the separating vessel. As a result of this controlled inflow of the gas-liquid mixture, a first part of the liquid will already be separated, whereby the liquid load on the agglomerating unit and separator mounted downstream is considerably reduced.

In the second separation stage, the mixture is forced through a horizontal "demister" or "coalescer," for instance, formed of a mesh of wires or "mesh pad," provided between a lower part of the vessel and an upper part of the vessel. As mentioned above, during infeed, a part of the liquid is already separated from the mixture by the pretreatment device. The separated liquid accumulates at the bottom of the lower compartment. The remaining part of the gas/liquid mixture is then guided through the coalescer. The liquid droplets in the mixture for guiding through the wire mesh collide with the wires and grow therewith into a liquid layer. If the speed of the supplied gas/liquid mixture is sufficiently low, the liquid from the liquid layer will drop back under the influence of the force of gravity into the lower compartment and fall into the liquid already present there.

In the third separation stage, the mixture is guided through one or more cyclones arranged in the upper compartment downstream of the agglomerating unit for further separating the mixture into a substantially liquid-containing mixture part and a substantially gas-containing mixture part. The mixture entering the cyclones is set into a rotating movement, whereby a heavy fraction, in which a relatively large amount of liquid is present, is flung against the outer wall of the cyclone and is discharged via openings in the side wall, thereby providing a further separation of the heavy and light fraction.

Cyclones with very high separation efficiency are known, for instance, disclosed in EP 1 154 862 A, the content of which should be deemed as interpolated herein. Described herein is an installation wherein a number of boxes with highly efficient axial recycle cyclones are arranged in the upper compartment of the vessel.

Instead of the vane type inlet device mentioned earlier, the first stage of the separation process may be performed by one or more cyclone-type pretreatment devices. The gas/liquid mixture entering the inlet nozzle of the separation vessel is guided to a cyclone where the mixture is set in spin by use of a swirl element including one or more guiding vanes or due to use of a tangential inlet to the main cyclone body. The heavy fraction of the mixture is thrown to the cyclone body outer wall, while the light fraction is being concentrated in the center of the cyclone flow body. The gas escapes upwards through a passage provided inside the cyclone flow body.

In conventional designs, the bottom part of the inlet cyclone, i.e., the heavy fraction outlet of the inlet cyclone, is submerged in liquid. This is due to the fact that there is a required static head of liquid needed in order to prevent gas from breaking out through the bottom of the cyclone. In applications where the available static head of liquid is too short, these kind of cyclonic inlet devices could not be used. This is because, if gas breaks through at the bottom of the cyclone, there is a possibility that large amounts of liquid are lifted upwards as the gas enters the liquid surrounding the cyclone. This liquid may in turn overload any second stage separation unit installed downstream of the inlet cyclone.

If an inlet cyclone were to be installed that is not (partially) submerged in the liquid in the lower compartment, then the following problems may arise. In some circumstances, too much gas escapes out of the liquid outlet of the inlet cyclone. If too much gas escapes from this outlet, the gas may have enough velocity to also entrain liquid upwards after leaving the bottom part of the cyclone from the liquid outlet. Also, the amount of gas leaving the bottom liquid outlet may be so large that it will interfere with the liquid surface. This may cause liquid to be entrained from the liquid surface, which causes the separation efficiency to deteriorate.

Another problem is that gas from the interior of the separation vessel may be sucked into the inlet cyclone through the liquid outlet of the cyclone. This may happen since there is a low pressure zone inside the inlet cyclone due to the rotating fluids. If gas is sucked into the inlet cyclone through the liquid outlet, this will block the liquid from being discharged properly. The result is that the liquid has to follow the gas flow upward through the passage in the flow body and the gas outlet of the inlet cyclone. This is the worst scenario as the separation efficiency of liquid becomes practically zero.

The present invention is directed to an inlet device and a system wherein the above-identified problems may be solved or reduced. The inlet device and system may also exhibit improved separation characteristics.

SUMMARY OF THE INVENTION

According to a first aspect of the present invention, a system for separating a mixture of at least one gas and at least one liquid into a heavy fraction mainly containing liquid and a light fraction mainly containing gas is disclosed wherein the system comprises:

- a separation vessel having a vessel inlet for the supply of the mixture to be separated, an upper vessel outlet for the discharge of the light fraction and a lower vessel outlet for the discharge of the heavy fraction;
- at least one inlet device for pretreatment of the incoming mixture, the inlet device, in use, being mounted in the separation vessel and connected to the vessel inlet, the inlet device comprising:

a casing having a liquid outlet for the discharge of a first mixture part mainly containing liquid to a lower compartment of the separation vessel;

a flow body arranged substantially concentrically in the casing;

a discharge channel extending from a gas inlet through the flow body to a gas outlet for the discharge of a second mixture part mainly containing gas to an upper compartment of the separation vessel;

rotation means for setting the mixture entering the inlet device into rotating movement, the rotation means being operative so as to cause a relatively heavy mixture part to be flung towards the wall of the casing and a relatively light mixture part to flow in a region close to the flow body; and at least one demister element arranged at a position below the gas outlet for separating liquid from the gas in the first mixture part flowing from the liquid output.

In one embodiment, the inlet device may also comprise a momentum breaker arranged below the liquid outlet of the casing so as to at least partially absorb the momentum of the first mixture part, and a demister element positioned upstream of the momentum breaker. The momentum breaker, for instance a plate-like element extending perpendicular to the relatively heavy mixture part flowing from the lower outlet of the inlet device, the plate being arranged below the liquid outlet, prevents the gas/liquid mixture to splash into the liquid sump in the lower compartment of the vessel. This reduces the amount of liquid that may be entrained by the gas/liquid mixture from the liquid surface. The separation efficiency may be improved even further by providing the at least one demister element. The momentum of the liquid/gas mixture leaving the cyclone outlet will then be partially absorbed at the same time as it will drain the liquid. Liquid is typically seen draining into the lower compartment of the separator through the lower part of the demister element. The gas changes direction and moves upwards. The effect is a further improvement of the overall separation efficiency of the inlet device.

In one embodiment, this demister element is placed on top of the momentum breaker, but the demister element may be arranged at any location between the momentum breaker and the liquid outlet of the cyclone. If we use, for example, a mesh with a solid plate below, the gas is distributed within the mesh and leaves the momentum breaker at a much lower velocity. Coalescence of liquid droplets will also happen within the mesh and hence we see a separation of liquid within the mesh. Since the gas leaves the momentum breaker at much lower velocities, the gas cannot entrain as much liquid as seen in the plate alternative. Less liquid entrained means less liquid transported upwards to the downstream demisters.

The plate is arranged (mesh or any other type of porous material, e.g., structured or random packing) in order to prevent the gas and liquid from splashing straight through the device. If this happens and the liquid level in the vessel is close enough to the momentum breaker, liquid entrainment occurs.

In some embodiments, the momentum breaker in the shape of one or more plate-like elements can be dispensed with and below the liquid outlet of the inlet cyclone only one or more demister elements are arranged. The momentum breaker may be embodied as a solid plate. Preferably, however, the momentum breaker comprises a perforated plate.

In another embodiment, the system comprises a second demister element arranged around the flow body at a position above the liquid outlet and below the gas outlet of the inlet device. The mixture leaving the liquid outlet contains a certain amount of liquid as is explained earlier. The second demister element, for instance a mesh pad and/or a vane pack and/or a multi-cyclone, will provide additional separation of the gas/liquid mixture before the mixture is guided to a further (second and/or third) separation stage under the condition that the gas amount leaving the liquid outlet is not so high that it will overload the second demister element.

In yet another embodiment, the separation vessel, in use, extends substantially vertically. In an upright separation vessel, the at least one second demister element is arranged over substantially the entire cross-section of the vessel around the flow body, so as to catch substantially the entire upward mixture flow.

In another embodiment, the separation vessel extends, in use, substantially horizontally. In a lying or horizontal separation vessel, the second demister element is arranged between the casing and the momentum breaker so as to form a substantially closed area through which the mixture from the lower output of the inlet device is to flow. In this way, substantially the entire mixture flow from the liquid outlet of the inlet device is to pass the at least one demister element.

As mentioned earlier, the internals of the separation vessel, i.e., the first, second and third stage separators, are embodied in one example so that the lower outlet of the inlet device extends, in use, above the liquid-gas interface of the liquid accumulated in the lower compartment of the separation vessel, which means that the outlet is not submerged in the liquid.

According to a second aspect of the present invention, an inlet device for pretreatment of a mixture of at least one gas and at least one liquid to be separated into a heavy fraction mainly containing liquid and a light fraction mainly containing gas is provided, the device comprising:

a casing having a liquid outlet for the discharge of a first mixture part mainly containing liquid;

a flow body arranged substantially concentrically in the casing;

a discharge channel extending from a gas inlet through the flow body to a gas outlet for the discharge of a second mixture part mainly containing gas;

rotation means for setting the mixture entering the inlet device into rotating movement, the rotation means being operative so as to cause a relatively heavy mixture part to be flung towards the wall of the casing and a relatively light mixture part to flow in a region close to the flow body; and at least one demister element arranged at a position below the gas outlet for further separation of liquid from the gas in the first mixture.

It is appreciated that although the preferred embodiments of the present invention are described for a three stage separation process, the inlet device according to the invention can be applied to a separation vessel without further separation stages or with the second or third separation stage only. In fact, the inlet device according to the present invention may be used in combination with any further separation means arranged inside the separation vessel for further separation of the mixture.

Especially good results, however, may be obtainable in a further embodiment wherein the separation means comprise one or more third demister elements (second stage), for example, one or more agglomerators/coalescers, for instance in an upright vessel extending substantially horizontally over substantially the entire cross-section of the vessel. Alternatively or additionally, the separation results may be improved when the system comprises, at a position between the upper vessel outlet and the inlet device, one or more axial cyclones, preferably recycle cyclones, for further separation of the mixture.

The present invention also relates to various methods of operating the system or the inlet device as described herein.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
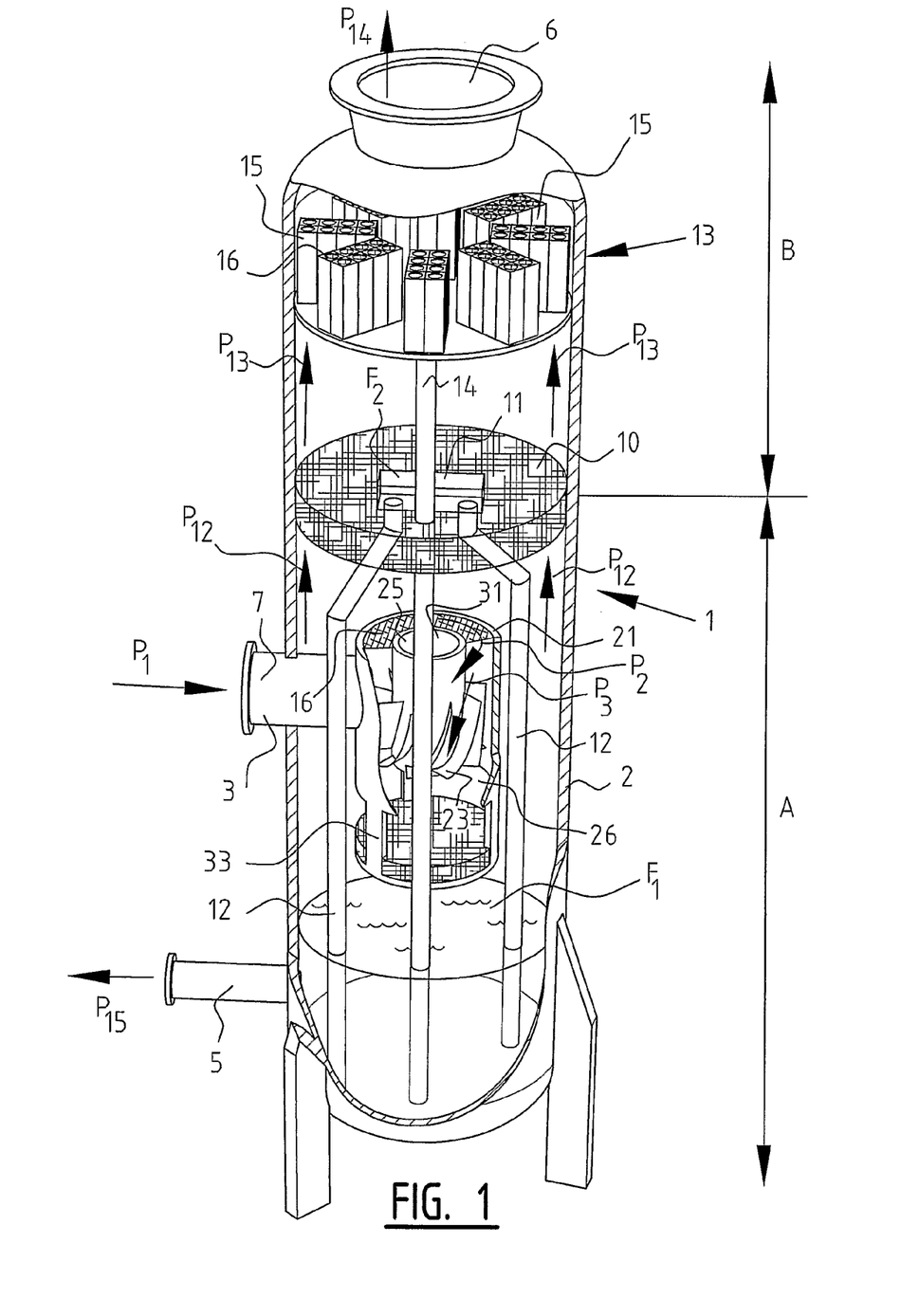
FIG. 1 shows a partly cut-away perspective view of an upright separation vessel according to one aspect, in which an inlet device according to a first embodiment of the present invention is arranged.

FIG. 1 shows one illustrative embodiment of the separation system 1. The figure shows an upright separation vessel 2 (separation column), for separating an incoming mixture into a substantially gas-containing fraction, also referred to as light fraction, and a substantially liquid-containing fraction (water and/or oil), also referred to as heavy fraction. Vessel 1 is provided with a connecting stub 3 for infeed of the gas/liquid mixture, a connecting stub 5 for the discharge of the heavy fraction (herein, for convenience, also referred to as the liquid) and a connecting stub 6 for discharge of the light fraction (herein, for convenience, also referred to as the gas). The connecting stub 5 is positioned in a lower compartment (A) of vessel 2 for drainage of the liquid $F_1$ collected at the bottom of the vessel 2. The connecting stub 6 is positioned in an upper compartment (B) of the vessel 2 for drainage of the gas.

Figure 3:
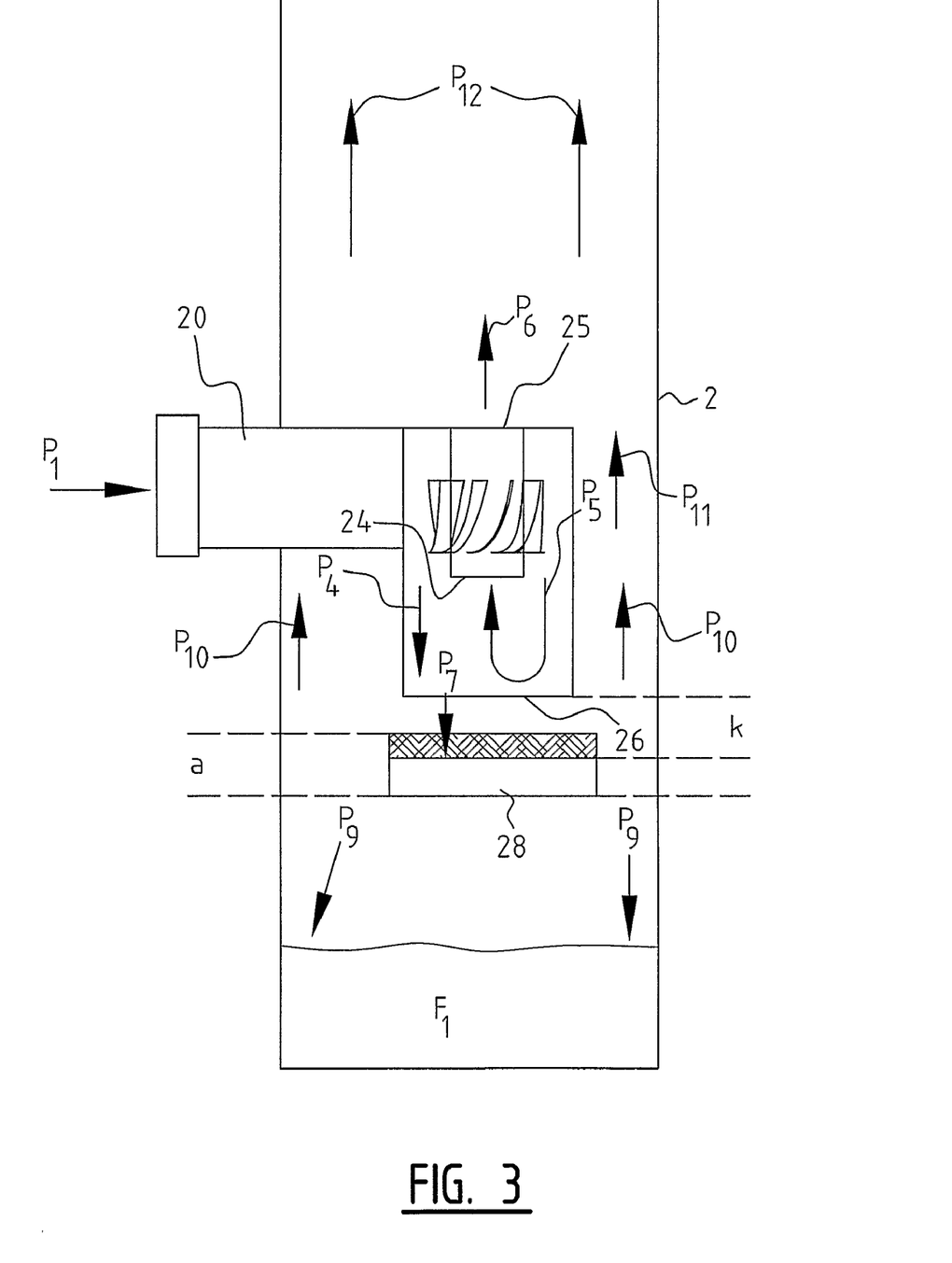
FIG. 3 shows schematically a cross-section of the first embodiment of the inlet device as shown in FIG. 1.

The gas/liquid mixture is introduced into the vessel 2 via a free-standing (i.e., non-submerged) inlet cyclone 7, as is shown in FIGS. 1 and 3. The inflowing mixture ($P_1$) from the inlet stub 3 is guided through a inlet tube 20 to a flow space defined ($P_2$) inside a generally vertically extending cyclone casing 21, closed at the top with top plate 16 and open at the bottom. Inside the flow space, a flow body 22 is arranged. Between the flow body 22 and the casing 21 is arranged a plurality of guiding vanes 23 for causing the oil/gas mixture flowing there along to be set into a rotating movement ($P_3$). The rotating movement generates centrifugal forces on the mixture causing a heavy fraction of the oil/gas mixture, in which a relatively large amount of liquid is present, to be flung against the wall 21 of the cyclone 7. The heavy fraction of the mixture is subsequently discharged from a heavy fraction outlet opening, also called a liquid outlet opening 26, at the bottom of the cyclone casing 21 (direction $P_4$). The light fraction, in which a relatively large amount of gas is present, remains in the center region around the flow body 22. The light fraction changes direction ($P_5$) and is eventually guided upward through the inlet 24 of a passage 31 provided inside the flow body 22 and discharged at the upper end of the cyclone 7 via an outlet opening 25 ($P_6$).

Figure 2:
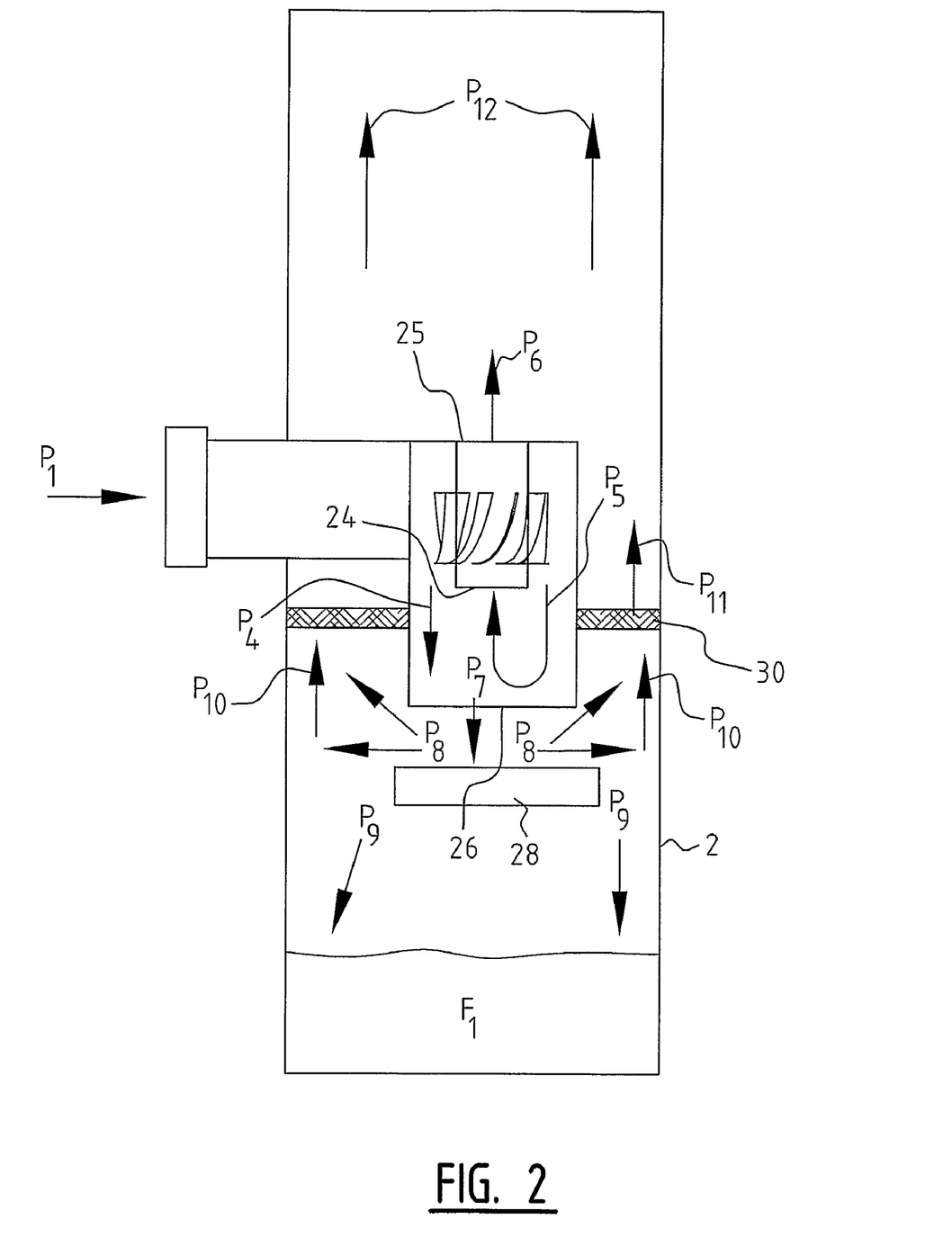
FIG. 2 shows schematically a cross-section of a second embodiment of an inlet device according to the present invention in a separation vessel.

Below the liquid outlet opening 26 of the inlet cyclone, a plate 28 is positioned. The plate 28 is mounted using support strips 33 to the casing 21 of the cyclone 7 or, alternatively, to the separation vessel 2 itself. The plate 28 is dimensioned so as to function as a momentum breaker of the mixture flow from the liquid outlet opening 26 of the cyclone, preventing the gas/liquid mixture from splashing on the liquid surface of the liquid $F_1$ accumulated at the bottom of the vessel 2. In the illustrative embodiments as shown in FIGS. 2 and 3, the plate 28 is provided with a wire mesh pad 27. The wire mesh pad 27 is placed on top of the momentum breaker.

The gas/liquid mixture leaving the bottom of the cyclone 7 together with the liquid impinges ($P_7$) upon the plate-like momentum breaker 28 causing the mixture to diverge sideways ($P_8$). See FIG. 2. A part of the diverged mixture ($P_9$) will end up in the fluid $F_1$ accumulated at the bottom of the vessel 2, while the remaining part of the mixture will be forced upward ($P_{10}$). The wire mesh pad 27 on top of the momentum breaker plate 28 will partially absorb the momentum of the mixture at the same time as it will drain some liquid out of the gas/liquid mixture. Liquid is typically seen draining downward through the lower part of the wire mesh pad 27. The absorption of the liquid improves the separation efficiency of the separator. Moreover, the gas that leaves the momentum breaker 28 becomes more efficiently distributed. Dependent on gas load, separation within the momentum breaker 28 may also actually be seen since coalescence of liquid droplets takes place within the demister element. Since the gas/liquid leaves the momentum breaker 28 at much lower velocities, the gas/liquid cannot entrain as much liquid as seen in the plate alternative. Less liquid entrained means less liquid transported upwards to any downstream separators.

The distance (k) between the liquid outlet opening 26 of the cyclone 7 and the plate 28 is chosen so as to provide the requested interruption of the momentum of the mixture flowing from the liquid outlet opening 26 of the cyclone 7. The distance depends on the load of the mixture flow entering the cyclone 7 and on the characteristics of the cyclone 7. In practice, the distance may vary between 5-50 cm. The thickness (a) of the mesh pad may vary between 3-40 cm.

Since the gas leaving the liquid outlet 26 will have liquid droplets entrained, the liquid droplets must be removed before the gas/liquid mixes with the main gas leaving the gas outlet 25 of the inlet cyclone 7. Failure in removing this liquid will mean that the demister situated above the inlet cyclone (if any) has to handle a relatively large amount of liquid. If the liquid load on that further demister element is too high, this may be overloaded and hence liquid carry over through gas outlet 6 may be seen.

FIG. 2 shows another embodiment of the present invention. The embodiment of FIG. 2 largely corresponds to the previous embodiment. Instead of a mesh pad placed on top of the momentum breaker 28, a horizontal wire mesh pad 30 is arranged around the outer surface of the casing 21 of the inlet cyclone 7 over substantially the entire cross-section of the vessel 2. The mesh pad 30 is arranged at a position between the liquid outlet opening 26 and the gas outlet opening 25.

The gas/liquid mixture, after having been deflected from the momentum breaker plate 28, is guided ($P_{10}$) through the mesh pad 30. A part of the liquid present in the gas/liquid mixture agglomerates in the mesh pad 30, i.e., the liquid is collected or accumulated in the mesh pad in relatively large liquid droplets. The relatively large liquid droplets fall downwards under the influence of gravity into the liquid sump $F_1$ at the bottom of the vessel and is discharged via liquid outlet 5 ($P_{15}$). The remaining gas/liquid mixture flowing upwards therefore contains a lesser amount of liquid, which results in a further improvement of the separation efficiency of the separator. Above the inlet cyclone, the remaining gas/liquid mixture is reunited with the gas from the gas outlet opening 25 and is guided to one or more further separation stages (if any), as will be explained hereafter.

Figure 4:
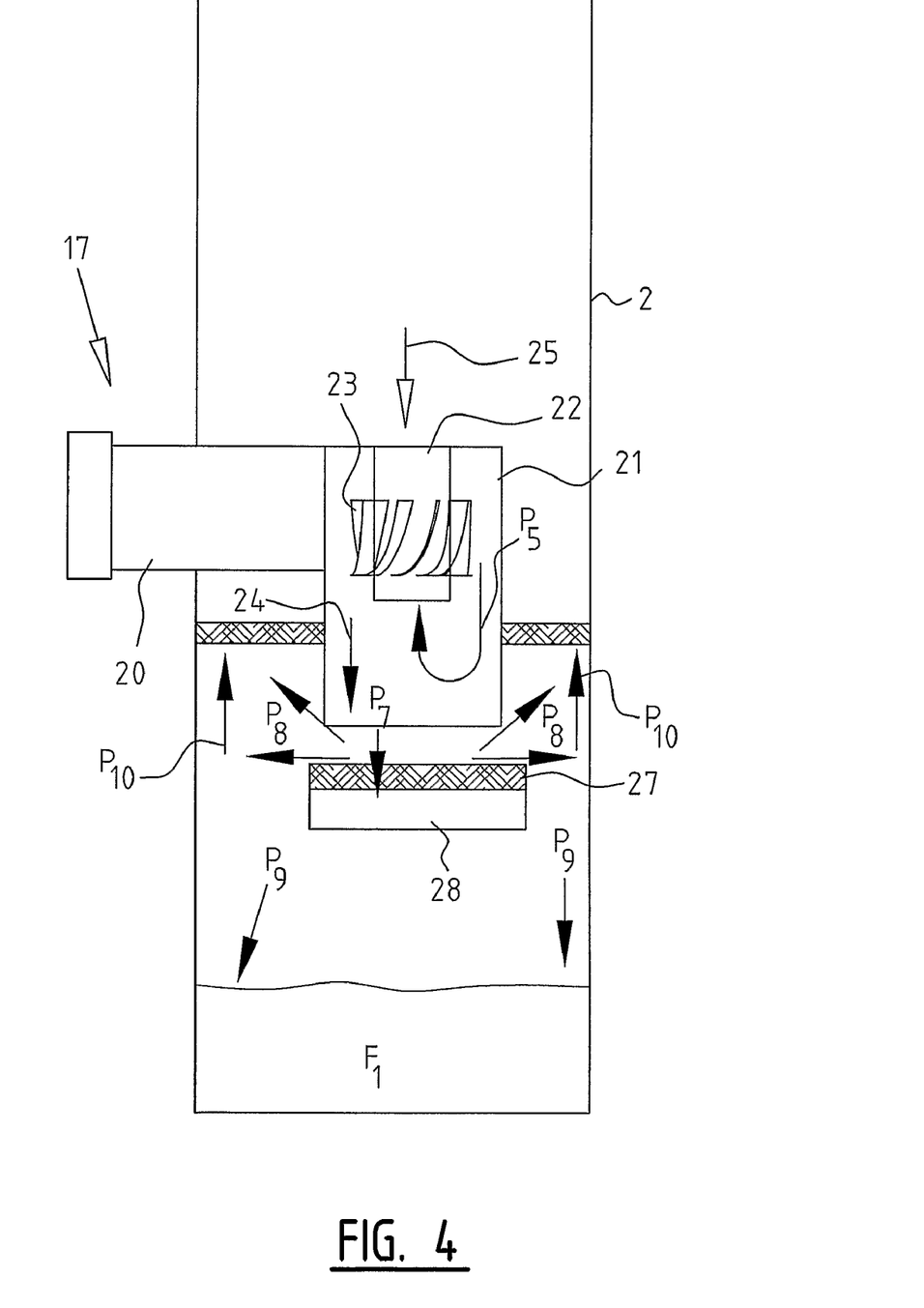
FIG. 4 shows schematically a cross-section of a third embodiment of an inlet device according to the present invention.

In FIG. 4, a third embodiment of the present invention is shown. In this embodiment, both a wire mesh pad 27 above the momentum breaker plate 28 and a wire mesh pad 30 have been arranged in the vessel 2.

In FIG. 1, an example is shown of further separation stages for separating the liquid from the gas/liquid mixture or light fraction after the mixtures from the gas outlet 25 and the liquid outlet 26 have been reunited. The separated light fraction, although it contains less liquid than the mixture supplied from outside, still has a certain liquid content, is first guided ($P_{12}$) at high speed through an agglomerating element 10 (also known as a demister element or a coalescer) in the second stage of the separation process. The agglomerating element 10 is disposed horizontally in the vessel 2 and thereby forms a separation between lower compartment A and upper compartment B of vessel 1. A detailed description of an example of a suitable agglomerating element 10 is given in WO 03/074156 A1, which is hereby incorporated in its entirety by reference.

The agglomerating element 10 causes agglomeration of the liquid, i.e., collecting or accumulating of the liquid in relatively large liquid droplets. The agglomerating element 10 may be embodied in a mesh, for instance, in the form of a number of layers of metal gauze. Other types of agglomerating units may, however, also be applied, such as one or more layers of structured packing or of vanes or vane packs. The coalescer is designed to function in a flooded condition. In order to prevent too much liquid collecting above the agglomerating unit surface and the distribution of the liquid displacing to the further separator still being adversely affected, the liquid is discharged via a collecting trough or collecting reservoir 11 in which liquid $F_2$ can be collected. Via two discharge conduits 12 extending below the level of liquid $F_1$ at the bottom of the lower compartment, the collected liquid $F_2$ can be carried to the lower compartment A of vessel 2, where the liquid can be drained via the discharge stub 5.

The mixture which is displaced further upward (arrow $P_{13}$), in which mixture a relatively large amount of gas and liquid is present in relatively large droplets, is further separated in a third stage by a number of cyclone separators. A number of boxes 13 is arranged for this purpose in upper compartment B of vessel 2 (FIG. 1). Provided downstream thereof is the connecting stub 6 for discharging the gas ($P_{14}$) which is dried to a considerable extent. Boxes 13 are each separately or jointly provided with a downcomer 14 which is in communication with liquid $F_1$ at the bottom of the vessel for draining liquid from each of the boxes.

In one embodiment, eight cyclones 15 are arranged in each of the boxes 13. In a particularly effective embodiment, these are axial recycle cyclones, preferably of the type as described in WO 00/25931, the disclosure of which is herein incorporated in its entirety by reference. Each cyclone 15 comprises, in this embodiment, a cylindrical wall 15 which forms on the underside an inlet for the gas/liquid mixture and has an outflow opening 16 on the upper side thereof. Roughly centrally in the space enclosed by the cylindrical wall is placed a so-called swirl element which is provided with blades for setting the mixture into rotating movement. A part of the mixture is flung outward by this rotating movement and transported via an interspace to a recycle conduit. The recycle conduit extends through the swirl element. Further connected to the space between the wall and the wall of the box is a downcomer 6, which is connected on the other side to the space at the bottom of the vessel for collecting liquid $F_1$. The separation efficiency of the type of axial recycle cyclone, in combination with the inlet device as described herein and even more so in combination with the agglomerating element 10 described herein, has been found to be particularly high, which enables, among other things, a compact embodiment of the installation.

Figure 5:
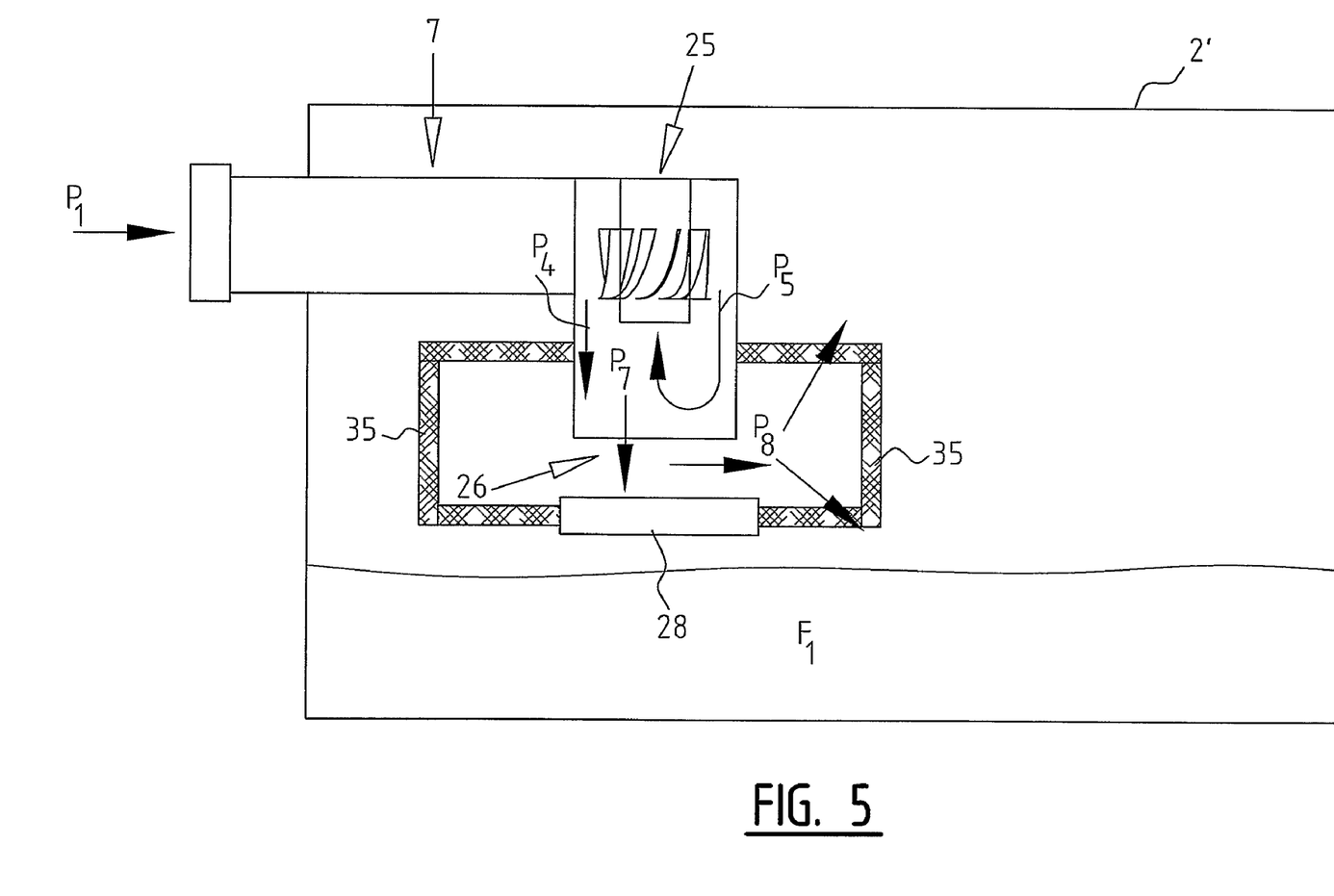
FIG. 5 shows schematically a cross-section of a fourth embodiment of an inlet device according to the present invention in a lying separation vessel.

The above-described three stage upright separation vessel provides an efficient separator for separating liquid/gas mixtures, for example, oil/gas mixtures, extending in an upright position. Although the upright separator is very compact and may be used in many applications, the separation vessel may also be placed in a lying or horizontal position. FIG. 5 shows a further embodiment wherein the inlet cyclone, which may be identical to the inlet cyclone described above or operates similarly, is mounted in a horizontal separation vessel or gravitation vessel 2'. In order to demist the gas/liquid leaving the liquid outlet opening 26, a wire mesh pad 35 is attached to the casing 21 and the momentum breaker plate 28 such that a closed area is formed through which the mixture from the lower output of the inlet device must flow. A part of the liquid present in the gas/liquid mixture traversing the wire mesh pad 35 agglomerates therein. The liquid then falls back into the liquid sump $F_1$ at the bottom of the vessel 2' and is discharged through a liquid outlet (not shown in the figure) in the vessel 2'. The remaining gas/liquid is fed, together with the gas/liquid mixture from the gas outlet opening 25, to one or more further stages (if any) for additional separation of liquid and gas.

Although the above embodiment, wherein a mesh surrounding the liquid outlet of the inlet cyclone is used, is described in connection with a lying vessel, such mesh surrounding the liquid outlet may, in a different preferred embodiment, also be used in an upright separation vessel.

In the embodiments described herein, the separation vessel is provided with one inlet device. In other embodiments, two or more inlet devices (cyclones) are arranged inside the vessel. When, for example, the height from the inlet to the liquid surface is too short to fit the inlet cyclone, two or more smaller-sized inlet devices are used. Each inlet cyclone can have its own momentum breaker plate and/or mesh or all inlet cyclones may share one common momentum breaker and/or mesh pad.

In the embodiments shown in the drawing, the rotation means of the inlet cyclone comprise one or more guiding vanes. The guiding vanes impart a rotating movement on the mixture flowing along the guiding vanes. In other embodiments, however, the inlet device comprises other rotation means, e.g., a tangential inlet part, for instance formed by an inner wall part of the casing, the inner wall part being curved so as to bring the mixture flowing there along into rotating movement. The tangential inlet causes the mixture entered in the inlet device to rotate.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A system for separating a mixture of at least one gas and at least one liquid into a heavy fraction mainly containing liquid and a light fraction mainly containing gas, the system comprising:
    a separation vessel having a vessel inlet for the supply of the mixture to be separated, an upper vessel outlet for the discharge of the light fraction and a lower vessel outlet for the discharge of the heavy fraction;
    at least one inlet device for pretreatment of the incoming mixture, the inlet device, in use, being mounted in the separation vessel and connected to the vessel inlet, the inlet device comprising:
        a casing having a liquid outlet for the discharge of a first mixture part mainly containing liquid to a lower compartment of the separation vessel;
        a flow body arranged substantially concentrically in the casing; and
        a discharge channel extending from a gas inlet through the flow body to a gas outlet for the discharge of a second mixture part mainly containing gas to an upper compartment of the separation vessel;
    rotation means for setting the mixture entering the inlet device into rotating movement, the rotation means being operative so as to cause a relatively heavy mixture part to be flung towards a wall of the casing and a relatively light mixture part to flow in a region close to the flow body;
    a first demister element arranged at a position below the liquid outlet for separating liquid from the gas in the first mixture part flowing from the liquid outlet; and
    a momentum breaker arranged below the liquid outlet of the casing so as to at least partially absorb the momentum of the first mixture part, the first demister element being positioned upstream of the momentum breaker.

2. The system according to claim 1, wherein in use the liquid outlet of the inlet device extends above the liquid-gas interface of the liquid accumulated in the lower compartment of the separation vessel.

3. The system according to claim 1, further comprising, at a position between the upper vessel outlet and the inlet device, at least one axial cyclone for further separation of the mixture.

4. The system according to claim 1, wherein the first demister element is placed on top of the momentum breaker.

5. The system according claim 4, further comprising a second demister element arranged around the casing at a position above the liquid outlet and below the gas outlet of the inlet device.

6. The system according to claim 1, wherein, between the upper vessel outlet and the inlet device, at least one separation means are arranged inside the separation vessel for further separation of the mixture.

7. The system as claimed in claim 6, wherein the separation means comprise one or more third demister elements.

8. The system as claimed in claim 7, wherein the separation vessel is an upright vessel and the third demister element extends substantially horizontally over substantially the entire cross-section of the vessel.

9. The system as claimed in claim 8, wherein the third demister element is provided with a drainage extending to the lower compartment of the separation vessel for discharge of liquid accumulated by the third demister element.

10. The system according claim 1, further comprising a second demister element arranged around the casing at a position above the liquid outlet and below the gas outlet of the inlet device.

11. The system according to claim 10, wherein in use the separation vessel extends substantially vertically.

12. The system according to claim 11, wherein the second demister element is arranged over substantially the entire cross section of the vessel around the casing.

13. The system according to claim 10, wherein in use the vessel extends substantially horizontally.

14. The system according to claim 13, wherein the second demister element is arranged between the casing and the momentum breaker so as to form a substantially closed area through which the mixture from the lower output of the inlet device is to flow.

15. An apparatus for pretreatment of a mixture of at least one gas and at least one liquid to be separated into a heavy fraction mainly containing liquid and a light fraction mainly containing gas, the device comprising:
    a casing having a liquid outlet for the discharge of a first mixture part mainly containing liquid;
    a flow body arranged substantially concentrically in the casing;
    a discharge channel extending from a gas inlet through the flow body to a gas outlet for the discharge of a second mixture part mainly containing gas;
    rotation means for setting the mixture entering the apparatus into rotating movement, the rotation means being operative so as to cause a relatively heavy mixture part to be flung towards the wall of the casing and a relatively light mixture part to flow in a region close to the flow body;
    a first demister element arranged at a position below the gas outlet for further separation of liquid from the gas in the first mixture; and a momentum breaker arranged below the liquid outlet of the casing, the first demister element being placed on top of the momentum breaker so as to at least partially absorb the momentum of the first mixture part.

16. The apparatus according to claim 15, further comprising a second demister element arranged around the casing at a position above the liquid outlet and below the gas outlet.

17. The apparatus according to claim 15, wherein the rotation means comprise one or more guiding vanes arranged between the flow body and the casing, the guiding vanes being at least partly curved so as to bring the mixture flowing there along into a rotating movement.

18. The apparatus according to claim 15, wherein the first demister element comprises a perforated plate.

19. The apparatus according to claim 15, wherein the first demister element comprises a mesh pad.

20. The apparatus according to claim 15, wherein the first demister element comprises a vane pack.

21. The apparatus according to claim 15, wherein the first demister element comprises a combination of any of a perforated plate and a mesh pad or a vane pack.

22. The apparatus according to claim 15, wherein the light fraction and heavy fraction comprise natural gas and oil and/or water respectively.

23. The apparatus according to claim 15, further comprising a second demister element arranged around the casing at a position above the liquid outlet and below the gas outlet.

24. The apparatus according to claim 15, wherein the rotation means comprise a tangential inlet part.

25. The apparatus according to claim 24, wherein the tangential inlet part is formed by an inner wall part of the casing, the inner wall part being curved so as to bring the mixture flowing there along into rotating movement.

26. An apparatus for pretreatment of a mixture of at least one gas and at least one liquid to be separated into a heavy fraction mainly containing liquid and a light fraction mainly containing gas, the device comprising:
    a casing having a liquid outlet for the discharge of a first mixture part mainly containing liquid;
    a flow body arranged substantially concentrically in the casing;
    a discharge channel extending from a gas inlet through the flow body to a gas outlet for the discharge of a second mixture part mainly containing gas;
    rotation means for setting the mixture entering the apparatus into rotating movement, the rotation means being operative so as to cause a relatively heavy mixture part to be flung towards the wall of the casing and a relatively light mixture part to flow in a region close to the flow body; and
    at least one demister element arranged at a position below the gas outlet for further separation of liquid from the gas in the first mixture, wherein the demister element comprises a mesh pad.

27. An apparatus for pretreatment of a mixture of at least one gas and at least one liquid to be separated into a heavy fraction mainly containing liquid and a light fraction mainly containing gas, the device comprising:
    a casing having a liquid outlet for the discharge of a first mixture part mainly containing liquid;
    a flow body arranged substantially concentrically in the casing;
    a discharge channel extending from a gas inlet through the flow body to a gas outlet for the discharge of a second mixture part mainly containing gas;
    rotation means for setting the mixture entering the apparatus into rotating movement, the rotation means being operative so as to cause a relatively heavy mixture part to be flung towards the wall of the casing and a relatively light mixture part to flow in a region close to the flow body; and
    at least one demister element arranged at a position below the gas outlet for further separation of liquid from the gas in the first mixture, wherein the demister element comprises a vane pack.

28. An apparatus for pretreatment of a mixture of at least one gas and at least one liquid to be separated into a heavy fraction mainly containing liquid and a light fraction mainly containing gas, the device comprising:
    a casing having a liquid outlet for the discharge of a first mixture part mainly containing liquid;
    a flow body arranged substantially concentrically in the casing;
    a discharge channel extending from a gas inlet through the flow body to a gas outlet for the discharge of a second mixture part mainly containing gas;
    rotation means for setting the mixture entering the apparatus into rotating movement, the rotation means being operative so as to cause a relatively heavy mixture part to be flung towards the wall of the casing and a relatively light mixture part to flow in a region close to the flow body; and
    at least one demister element arranged at a position below the gas outlet for further separation of liquid from the gas in the first mixture, wherein the demister element comprises a combination of any of a perforated plate and a mesh pad or a vane pack.

29. A system for separating a mixture of at least one gas and at least one liquid into a heavy fraction mainly containing liquid and a light fraction mainly containing gas, the system comprising:
    a separation vessel having a vessel inlet for the supply of the mixture to be separated, an upper vessel outlet for the discharge of the light fraction and a lower vessel outlet for the discharge of the heavy fraction;
    at least one inlet device for pretreatment of the incoming mixture, the inlet device, in use, being mounted in the separation vessel and connected to the vessel inlet, the inlet device comprising:
        a casing having a liquid outlet for the discharge of a first mixture part mainly containing liquid to a lower compartment of the separation vessel;
        a flow body arranged substantially concentrically in the casing; and
        a discharge channel extending from a gas inlet of the flow body through the flow body to a gas outlet of the flow body for the discharge of a second mixture part mainly containing gas to an upper compartment of the separation vessel;
    rotation means for setting the mixture entering the inlet device into rotating movement, the rotation means being positioned between said casing and said flow body and being operative so as to cause a relatively heavy mixture part to be flung towards a wall of the casing and a relatively light mixture part to flow in a region close to the flow body; and
    at least one demister element arranged at a position below the liquid outlet for separating liquid from the gas in the first mixture part flowing from the liquid outlet of the casing.

30. An apparatus for pretreatment of a mixture of at least one gas and at least one liquid to be separated into a heavy fraction mainly containing liquid and a light fraction mainly containing gas, the device comprising:

a casing having a liquid outlet for the discharge of a first mixture part mainly containing liquid;
a flow body arranged substantially concentrically in the casing;
a discharge channel extending from a gas inlet of the flow body through the flow body to a gas outlet of the flow body for the discharge of a second mixture part mainly containing gas;
rotation means for setting the mixture entering the apparatus into rotating movement, the rotation means being positioned between said casing and said flow body and being operative so as to cause a relatively heavy mixture part to be flung towards the wall of the casing and a relatively light mixture part to flow in a region close to the flow body; and
at least one demister element arranged at a position below the gas outlet of the casing for further separation of liquid from the gas in the first mixture.

* * * * *